United States Patent
Yuan et al.

(10) Patent No.: US 8,811,829 B2
(45) Date of Patent: *Aug. 19, 2014

(54) PHOTON DETECTOR

(75) Inventors: Zhiliang Yuan, Cambridge (GB); Andrew James Shields, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/421,023

(22) Filed: Mar. 15, 2012

(65) Prior Publication Data

US 2012/0230702 A1 Sep. 13, 2012

Related U.S. Application Data

(63) Continuation of application No. 12/529,495, filed as application No. PCT/GB2008/000722 on Feb. 29, 2008.

(30) Foreign Application Priority Data

Mar. 1, 2007 (GB) .................................. 0704007.4

(51) Int. Cl.
*H04B 10/06* (2006.01)

(52) U.S. Cl.
USPC ........... 398/208; 398/202; 398/209; 398/210; 398/212

(58) Field of Classification Search
None
See application file for complete search history.

(56) References Cited

U.S. PATENT DOCUMENTS

| 4,431,916 | A | * | 2/1984 | Couch | 250/214 R |
| 5,143,509 | A | * | 9/1992 | Focke | 414/796 |
| 5,184,188 | A | * | 2/1993 | Bull et al. | 356/39 |
| 6,218,657 | B1 | * | 4/2001 | Bethune et al. | 250/214 R |
| 7,242,774 | B1 | * | 7/2007 | Elliott et al. | 380/256 |
| 7,705,284 | B2 | * | 4/2010 | Inoue et al. | 250/214 R |
| 2004/0032954 | A1 | * | 2/2004 | Bonfrate et al. | 380/263 |
| 2005/0100351 | A1 | * | 5/2005 | Yuan et al. | 398/214 |
| 2010/0111305 | A1 | | 5/2010 | Yuan et al. | |
| 2011/0108712 | A1 | | 5/2011 | Thomas et al. | |

FOREIGN PATENT DOCUMENTS

| JP | 4-315965 | * 11/1992 | G01R 19/00 |
| JP | 2006-287307 | 10/2006 | |
| WO | WO 01/63803 A1 | 8/2001 | |

OTHER PUBLICATIONS

Namekata et al: "800 MHz Single-Photon detection at 1550-nm using an InGaAs/InP avalanche photodiode operated with a sine wave gating", Optics Express, Oct. 16, 2006, pp. 10043-10049.*
Donald S. Bethune, et al., "Autocompensating quantum cryptography" New Journal of Physics, vol. 4, No. 1, Jul. 1, 2002, XP020080114, pp. 42.1-42.15.
C. Gobby, et al., "Quantum key distribution over 122 km of standard telecom fiber", Applied Physics Letters, vol. 84, No. 19, May 10, 2004, XP012061371, pp. 3762-3764.

(Continued)

*Primary Examiner* — Li Liu
(74) *Attorney, Agent, or Firm* — Oblon, Spivak, McClelland, Maier & Neustadt, L.L.P.

(57) ABSTRACT

A photon detection system including a photon detector configured to detect single photons, the photon detector being gated such that it produces a periodic output signal and the gating signal having a frequency of at least 50 MHz. The system further includes a combiner for combining the signal from one period with signals from other periods such that periodic variations in the output signal of the detector are suppressed.

22 Claims, 12 Drawing Sheets

(56) References Cited

OTHER PUBLICATIONS

Z.L. Yuan, et al., "High speed single photon detection in the near infrared", Applied Physics Letters, vol. 91, No. 4, Jul. 27, 2007, XP012100194, pp. 41114-1-41114-3.

Sun Zhi-Bin, et al., "Single-Photon Detection at Telecom Wavelengths" Chinese Physics Letters, vol. 24, No. 2, Feb. 2007, pp. 574-576.

* cited by examiner

PHOTON DETECTOR

CROSS-REFERENCE TO RELATED APPLICATIONS

This application is a continuation of and claims the benefit of priority under 35 U.S.C. §120 from U.S. Ser. No. 12/529,495 filed Nov. 17, 2009, the entire contents of which are incorporated herein by reference. U.S. Ser. No. 12/529,495 is a National Stage of PCT/GB08/000,722 filed Feb. 29, 2008 which was not published under PCT Article 21(2) in English and claims the benefit of priority from British Patent Application No. 0704007.4 filed Mar. 1, 2007.

The present invention relates to the field of photon detectors and methods for detecting photons which are configured to detect the presence of a single photon.

Detectors which are capable of detecting a single photon so-called single photon detectors are an important component of any system which operates using the principles of quantum cryptography. Such systems rely upon the transmission of data bits as single particles, in this case, photons, which are indivisible.

Single photon detection is also useful as a low level light detection means for time of flight ranging experiments, spectroscopy, medical imaging or astronomy. Both in medical and astronomical applications the high energy photons (X-ray etc) or high energy particles are converted in scintillators into many (10-100) low energy photons. These low energy photons are then detected by avalanche photodiodes or photomultiplier tubes. As the low energy photons that are produced are scattered in space there is a need for large area detectors which are very sensitive. Also arrays of such detectors allow the spatial distribution of low energy photons to be obtained in order to gain information about the original photon.

One problem which many single photon detectors suffer from is that the signal which is outputted due the detection of a single photon is often weak and sometimes difficult to distinguish from other artefacts of the detector output.

For example, a particularly popular type of single photon detector is the avalanche photo-diode (APD) operating in gated mode. In gated mode, to detect a photon, a short duration of high reverse bias is applied across the APD which is above the breakdown voltage of the diode. An absorbed photon generates an electron-hole pair in the APD, which upon separation can trigger an avalanche of excess carriers. This avalanche of excess carriers causes a macroscopic and detectable current flow thorough the APD.

Although this macroscopic current is detectable, it is usually buried within artefacts of the output signal of the APD caused by the capacitance of the APD in reaction to the biasing gates. One solution to this problem is to bias the APD to an extent where the avalanche current dominates the output of the detector. However, this has the disadvantage that the APD needs to be operated at relatively low frequencies.

Other ways to address this problem have been to mimic the response of the APD by a capacitor or by a second APD (Tomita et al. Optics Letters 27 1827 to 1829 (2002). Both of these systems suffer with problems in accurately reproducing the output of the first APD and in practicalities of combining the output of the first APD with that of the capacitor or second APD.

The present invention attempts to address the above problems and in a first aspect provides a photon detection system comprising a photon detector configured to detect single photons, a signal divider to divide the output signal of the photon detector into a first part and a second part, where the first part is substantially identical to the second part, delay means for delaying the second part with respect to the first part and a combiner for combining the first and delayed second parts of the signal such that the delayed second part is used to cancel periodic variations in the first part of the output signal.

By dividing the output of the detector into two parts and combining the signal from a period with the signal from later periods, periodic variations in the output of the detector are removed. Since the detector output is used to correct itself, the problems of the prior art which try to replicate the detector output are avoided.

Preferably, the photon detector is an avalanche photodiode, but may also be other photon detectors.

Preferably, the detector receives a periodic signal and said delay means are configured to delay the second part of the signal by an integer multiple of said period. However, it is possible for the system to isolate a single period or a mulitple of periods from the second part of the signal and repeatedly use this isolated signal to cancel periodic variations in the first part of the signal. For example, the period of the waveform may be stored digitally, the stored waveform may then be used to perform cancelling using digital processing.

Preferably, the system comprises means to apply a periodic gating signal to said detector. The gating signal may be a square wave signal or a sinusoidal signal etc. As the present invention enhances the presence of the signal due to a single photon without increasing the bias required across the detector, the detector of the present invention may operate at higher frequencies than those of the prior art. The present invention may therefore have a gating signal with a frequency of 50 MHz or more, preferably 70 MHz or more, even more preferably 100 MHz or more.

As the present invention can be used at higher gating frequencies, it can achieve quasi-continuous operation. In quasi-continuous operation, there is no synchronization required between the source of photons and the detector. Quasi continuous operation is possible because for very high gating frequencies, the period at which the detector is incapable of detecting photons is not prohibitive to the overall detection efficiency.

To enhance quasi continuous operation, it is possible to vary the period of the gating signal to broaden the detection window. The period may be varied randomly or as noise.

Generally, the two signals which arrive at the combiner will be balanced. However, the system may further comprise means to balance the amplitudes of the two signals arriving at the combiner. For example, the system may further comprise a tunable attenuator.

The system may also comprise means to invert one part of the signal with respect to the other part. Inversion may be achieved at either the divider, combiner or during transfer between the divider and combiner. Inversion may be achieved by many methods, for example, using a hybrid junction which performs division/combination and inversion.

It is also possible to use a differential component, for example, a differential amplifier, to combine the signals.

In a second aspect, the present invention provides a quantum communication system comprising a sender and a receiver, said sender comprising a source of pulsed radiation and an encoder for encoding information on said radiation pulses, said receiver comprising a detection system according to the first aspect of the present invention.

The quantum communication system may be configured for QKD protocols, for example said encoding means may be configured to encodes pulses using an encoding base randomly selected from two or more non-orthogonal basis.

Synchronised operation is preferred for all QKD applications, as the source always emits in regular interval. However, some protocols, for example, DPSK and Stucki protocols as described below require coherence for neighbouring pulses, which usually requires source operating at GHz frequencies. The high speed operation of the detection system of the present invention is particularly advantageous for these protocols.

The present invention is of particular use in the so called one-way weak coherent protocol (D Stucki et al, Applied Physics Letters 87, 194108(2005)). Thus, in a further embodiment, the sender may comprises a coherent source and said encoder encodes information by selectively transmitting pulses having an average intensity of less than one photon and empty pulses have no photons.

Also, the high speed operation of the detection system may advantageously be used in the differential phase shift protocol (Takesue et al. New Journal of Physics 7 (2005) 232) Thus, in a yet further embodiment, the sender may comprise a coherent source, said encoding means being configured to encode photons with a first phase or a second phase and the difference between the first phase and the second phase is 180° and wherein the receiver is configured to interfere photons from one pulse with those of the following pulse.

In a third aspect, the present invention provides a conditioning circuit for conditioning the output of a photon detector, the circuit comprising, a signal divider to divide the output signal of the photon detector into a first part and a second part, where the first part is substantially identical to the second part, delay means for delaying the second part with respect to the first part and a combiner for combining the first and delayed second parts of the signal such that the delayed second part is used to cancel periodic variations in the first part of the output signal.

Although the detection system according to a first aspect of the present invention can be operated in a quasi-continuous mode, it may also be gated and synchronised with the output of a periodic source. In a fourth aspect, the present invention provides a system comprising a periodic source and a detection system according to the first aspect of the invention, said detection system further comprising a gating signal, said gating signal being configured to gate said detector to detect during the arrival times of the highest intensity signal from the source.

The above system may be advantageously used for example in: time of flight ranging experiments to determine the distances of objects; industrial inspection as the ability to detect single photons allows accurate measurements to be made of the dimensions of an object by measuring a pulse reflected from an object under inspection; and time resolved emission experiments to determine the chemical recipe of a composite.

In a fifth aspect, the present invention provides a photon detection method comprising: providing a photon detector configured to detect single photons; dividing the output signal of said photon detector into a first part and a second part, where the first part is substantially identical to the second part, delaying the second part with respect to the first part; and combining the first and delayed second parts of the signal such that the delayed second part is used to cancel periodic variations in the first part of the output signal.

The present invention will now be described with reference to the following non-limiting embodiments in which:

FIG. 1a is a schematic of a prior art detection system using an avalanche photodiode (APD), FIG. 1b is a schematic plot of voltage against time for the input signal of the APD of FIG. 1a and FIG. 1c is a plot of the output signal as voltage against time for the detection system of FIG. 1a;

Figure 7:
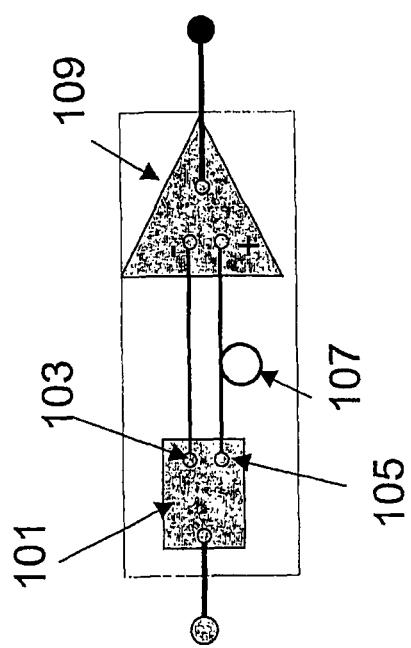
Figure 8:
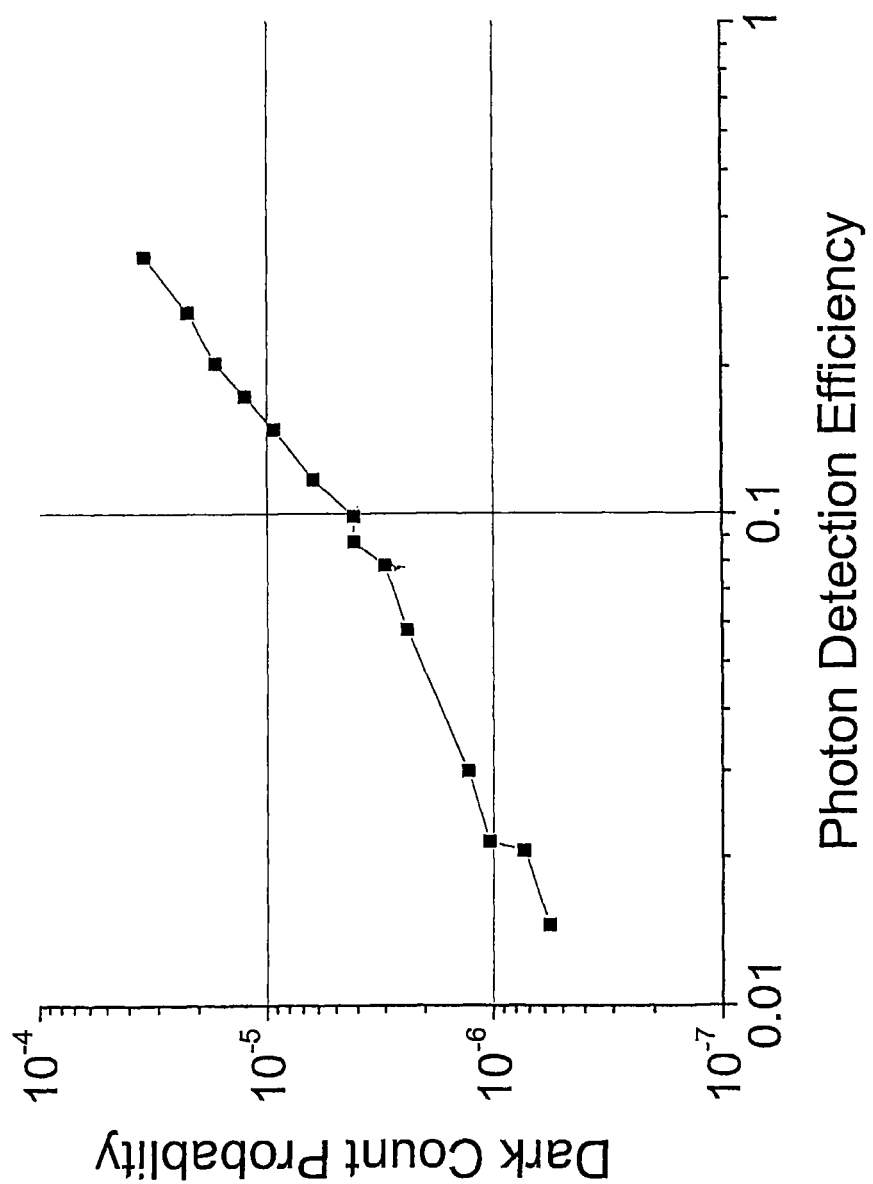
Figure 9:
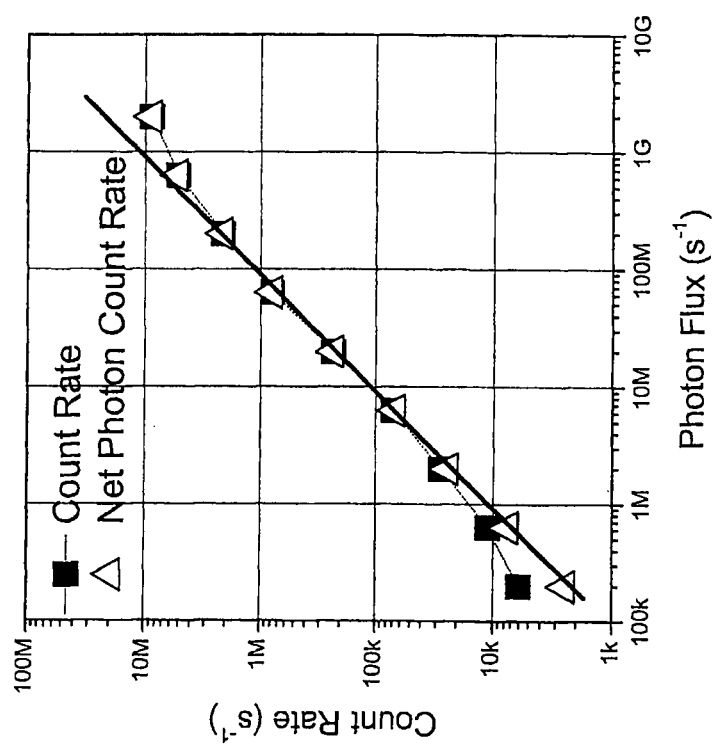

FIG. 4a is a schematic of a detection system comprising an avalanche photodiode in accordance with an embodiment of the present invention, FIG. 4b is a plot of the input signal to the device of FIG. 4a, FIG. 4c is a plot of a first part derived from the output signal of the APD of FIG. 4a, FIG. 4d is a plot of the second part derived from the output signal of the APD of FIG. 4a which has been delayed and FIG. 4e is a plot of the self-differenced output signal produced by the device of FIG. 4a;

FIG. 5a is a variation on the device of FIG. 4a, FIG. 5b is a first part of the output signal of the device of FIG. 5a, FIG. 5c is a delayed second part of the output signal of the APD in FIG. 5a and FIG. 5d is a plot of the output signal of the detection system of FIG. 5a;

FIG. 6a is a schematic of a further variation on the detection system of FIG. 4a and FIG. 6b is a plot of the input signal to the detection system of FIG. 6a;

FIG. 7 is a schematic of a detection system which is a variation of the detection system of FIG. 4a;

FIG. 8 is a plot of the dark count probability against photon detection efficiency for the detection system of FIG. 4a;

FIG. 9 is a plot of the count rate against photon flux per second showing the quasi-continuous detection operation of the present invention;

FIG. 10a is a quantum communication system having a detection system as previously described with reference to FIG. 4a, FIG. 10b is the clocking signal for the quantum communication system of FIG. 10a, FIG. 10c shows the outputted laser pulse for the transmitter system of FIG. 10a, FIG. 10d is a plot of the signal arriving at the detector for the detection system of FIG. 10a and FIG. 10e shows a potential gating system for the detector used in FIG. 10a;

FIG. 11a is a schematic of a quantum communication system which uses a protocol based on phase coherence between adjacent pulses, FIG. 11b is a plot of the pulse sequence which may be sent using the system of FIG. 11a and FIG. 11c is a schematic of the gating requirements of the detectors of FIG. 11a; and FIG. 12a is a schematic of a quantum communication system which uses a detector in accordance with the present invention and which is based on a differential phase shift protocol, FIG. 12b is a schematic of the pulse train sent from the transmitter to the detector; FIG. 12c is a schematic of the pulse train which passes through the short arm of the receiving interferometer, FIG. 12d is a schematic of the pulse train which passes through the long arm of the receiving interferometer, FIG. 12e is a schematic of the possible photon detection times by detector D1 of FIG. 12a and FIG. 12f is a schematic of the possible photon detection time s by the detector D2 of FIG. 12a.

Figure 1:
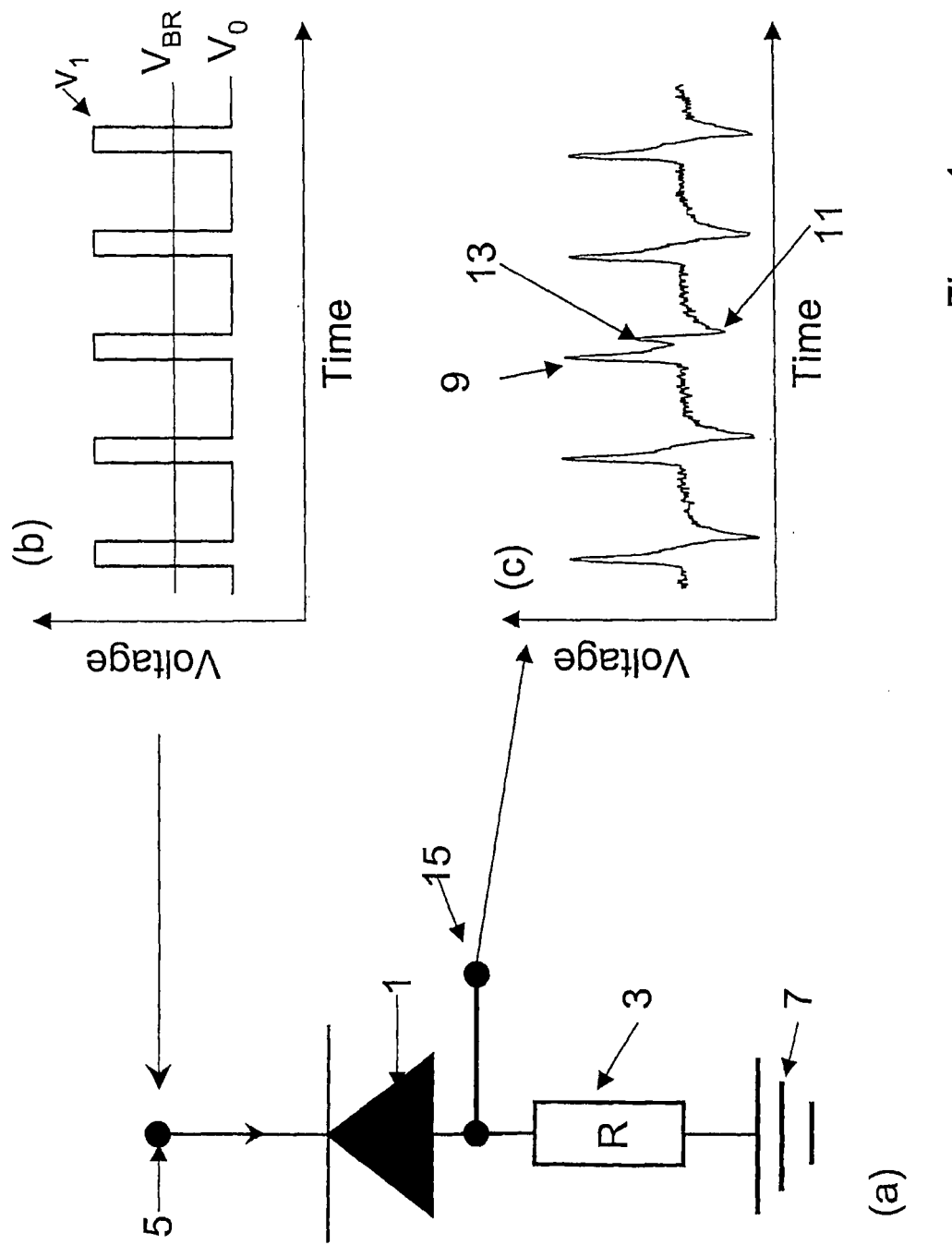

FIG. 1a is a schematic of a known detection system which may be used to detect single photons. It comprises an avalanche photodiode 1 and a resistor 3. The avalanche photodiode (APD) 1 is configured in reverse bias. An input signal which acts as a gating signal is shown in FIG. 1b is applied between input 5 and ground 7.

The input voltage shown in FIG. 1b is a periodic series of rectangular voltage pulses, which varies between a first value $V_1$ and a second value $V_0$. $V_1$ is selected to be above the breakdown voltage $V_{BR}$ of the avalanche photodiode 1. When such a voltage is applied to the avalanche photodiode, the detector becomes sensitive to incoming photons. An absorbed photon generates an electron-hole pair in the APD, which are separated by the electric field inside the APD. Due to the high electric field within the avalanche region of the APD, the electron or hole may trigger an avalanche of excess carriers causing a macroscopic and detectable current flow thorough the APD.

The macroscopic current is usually detected by monitoring the voltage drop across a resistor 3 as shown in FIG. 1*c*. A voltage spike 13 indicates that a photon has been detected. However, as the APD has a finite capacitance, typically one pico-Farad, the output also contains a charging pulse 9 due to the charging of the APD capacitance when reacting to the rise edge of the gating pulse, followed by a discharging dip 11 due to the discharging of the APD capacitance when reacting to the falling bias at the falling edge of a gate pulse. The charging pulse is positive, and often obscures a photon induced avalanche.

It is clear from the results shown in FIG. 1*c* that it is difficult to isolate peak 13 which is due to absorption of a single photon. For an avalanche due to photon absorption to be detectable, one method is to increase the APD bias voltage so that amplitude of an avalanche spike exceeds that of the charging pulse. An avalanche can then be detected by setting discrimination level above that of all charging pulses. However, such a method has serious shortcoming. APDs usually contain crystallographic defects, and those defects act as traps to confine electrons from the macroscopic avalanche current flow during a detection event. Trapped electrons will be released spontaneously after some delay causing a second, spurious avalanche when the following gate is applied. Such a spurious pulse is called "afterpulse", and its probability depends on the size of the avalanche current. To limit the afterpulse probability, APDs are typically operated at low gating frequencies (up to a few MHz) if biasing is used to achieve avalanches larger than charging pulses.

To increase the APD operation frequency, it is necessary to remove or limit the amplitude of the charging pulse 9.

Figure 2:
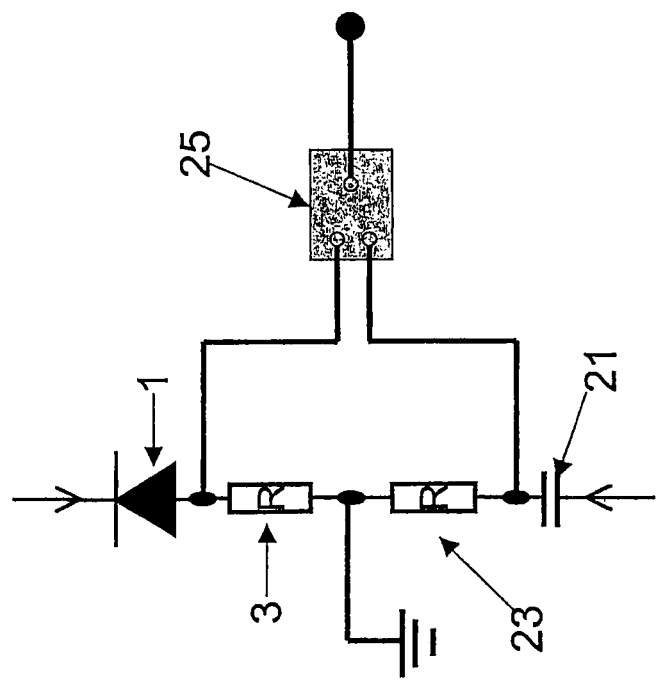
FIG. 2 is a detection system incorporating an avalanche photodiode and a capacitor in accordance with the prior art.

One attempt at doing this is shown in FIG. 2. To avoid unnecessary repetition, like reference numerals will be used to denote like features with those of FIG. 1. FIG. 2 again has an avalanche photodiode 1 and resistor 3. A capacitor 21 and further resistor 23 are formed in series with the avalanche photodiode 1 and resistor 3 such that resistors 3 and 23 are connected back to back.

From this circuit, the combined DC and pulsed bias for the APD varying between $V_0$ and $V_1$ is applied to the APD, while just the pulse signal (varying between $V_1$ and $V_0$) is applied to the capacitor. The output signal from the capacitor 21 will be similar to the output signal from APD 1 in the absence of absorption of a photon. The output from the APD 1 and capacitor 21 are then combined in hybrid junction 25. Hybrid junction 25 will reverse the phase of one of its two inputs. Therefore, the hybrid junction 25 combines the output signals from both the APD 1 and the capacitor 21 with a 180° phase difference so that they nearly cancel. This allows the charging 9 and discharging 11 peaks to be partially cancelled.

The arrangement of FIG. 2 suffers from the problems in that it is difficult for the capacitor to simulate the response of the APD. Also, there is a need from the pulsed output signal from both the APD 1 and the capacitor 21 to arrive at the hybrid junction 25 at exactly the same time. Further, it is also necessary for the output of the APD 1 and the output of a capacitor 21 to have equal amplitudes.

Figure 3:
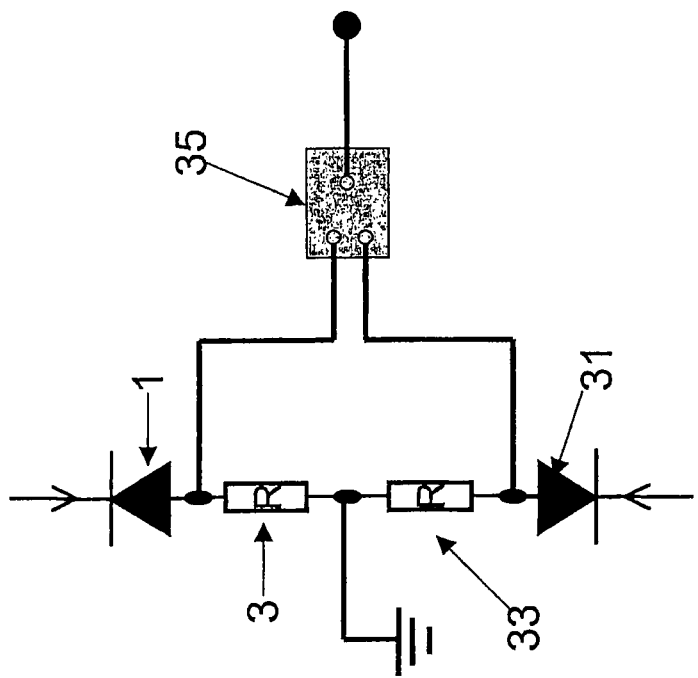
FIG. 3 is a schematic of a detection system according to the prior art comprising two APDs arranged to cancel one another.

FIG. 3 illustrates a further improvement to the system of FIG. 2 where capacitor 21 is now replaced with a second APD 23.

To avoid unnecessary repetition, like reference numerals will be used to denote like features.

A second resistor 31 and a second APD 33 are provided in the same positions as second resistor 23 and capacitor 21 of FIG. 2. The output of the first APD 1 and second APD 33 are then combined at hybrid junction 35 with 180° phase difference in order for the components to cancel one another. The output of the hybrid junction is then fed into discriminator 37 (not shown) which in turn determine their presence of peaks due to single photon detection.

The device of FIG. 3 suffers from many of the problems of the system shown in FIG. 2. Furthermore, selecting APDs with similar characteristics involves costly characterisation of devices. In particular, it is very difficult to find two APDs with identical electrical characteristics even with careful selection of devices. The APDs are likely to have different capacitances, which will mean that the cancellation of their output signals will be poor.

FIG. 4*a* schematically illustrates a system in accordance with an embodiment of the present invention. As before, the device comprises an avalanche photodiode provided in series with a resistor 53.

An input signal as shown in FIG. 4*b* may be applied. This is identical to the input signal described with reference to FIG. 1*b*. The voltage dropped across the resistor 53 is first input to power splitter 55. Power splitter 55 divides the output signal into a first part as shown in FIG. 4*c* and a second part which is identical to the first part shown in FIG. 4*c*. These two signals are then output via ports 57 and 59 of power splitter 55. The signal which is output via port 59 enters a delay line 56 which serves to delay the signal by a duration equal to the gating period. The delayed signal is shown in FIG. 4*d*. The first part of the signal and the delayed second part are then fed into hybrid junction 61. Hybrid junction 61 combines the first and the delayed second parts of the signals with 180° phase shift to give the output shown in FIG. 4*e*.

As can be seen in FIG. 4*c*, the detection of a photon by APD 51 produces an avalanche signal 73. This avalanche signal is then repeated one period later in the trace of FIG. 4*d*. By combining 4*c* and 4*d*, a peak 77 and a dip 75 are seen in the trace of FIG. 4*e* which indicates the presence of a photon. The provision of a positive peak followed by a negative dip (or a negative dip followed by a positive peak dependent on the configuration of the equipment) allows a clear signature indicating the detection of a photon.

A preferred mode of detection is to test for both the presence of positive peak 77 and negative dip 75 in the output signal. Alternatively, however it may be more convenient to test for just the positive peak alone or just the negative dip alone. The peaks or dips may be detected using discrimination techniques. Discrimination techniques use a discriminator level. Voltage signals which are larger than said discriminator level are assumed to be due to detection of a photon.

The power splitter 55 may be of the type which is sold under part number ZFRSC-42+ from Mini-circuits and the hybrid junction is also available under part number ZFSCJ-2-4 which is also available from Mini-circuits. The exact delay can be realised by using two co-axial cables with two different lengths that link the power splitter and the hybrid junction. It should be noted that the combination of the power splitter 55, the delay line 56 and the hybrid junction 61 may be integrated onto a single printed circuit board.

Figure 4:
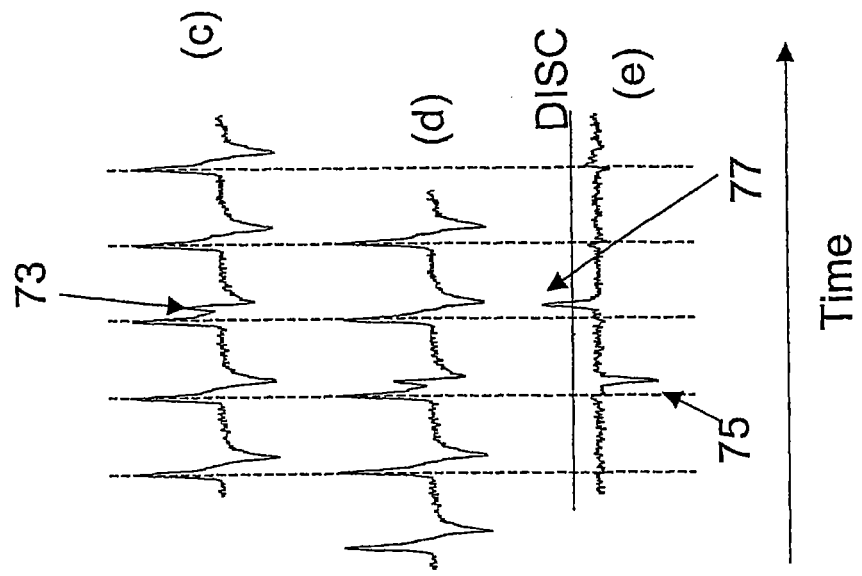
Figure 4:
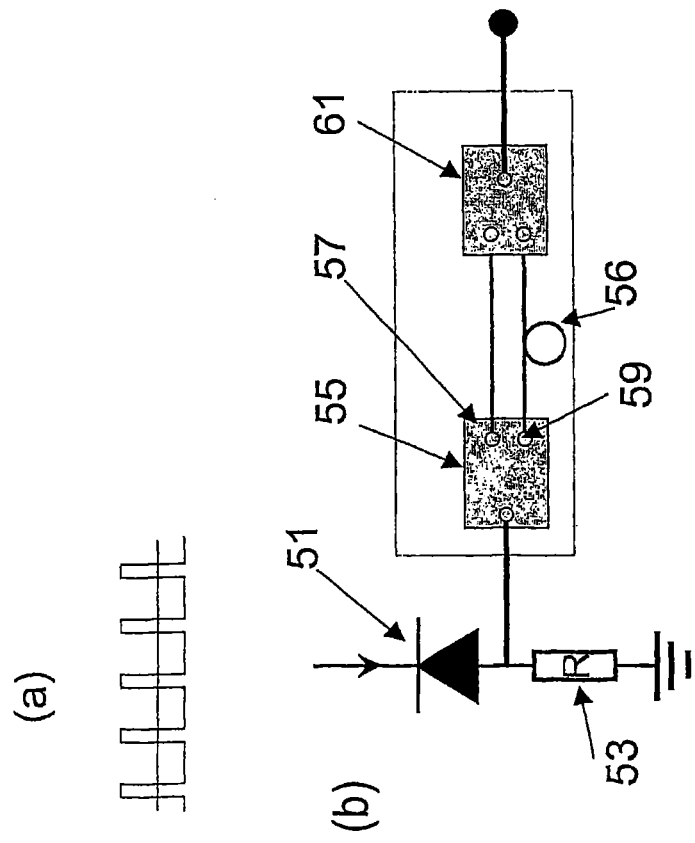
Figure 5:
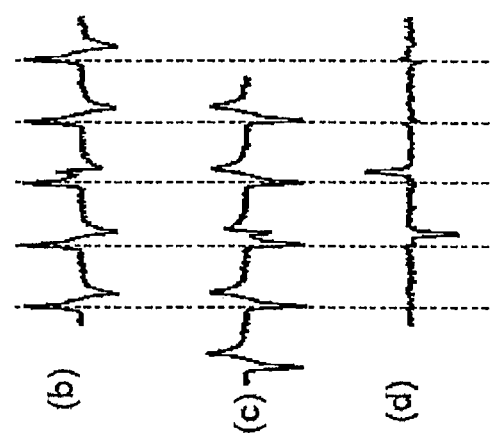
Figure 5:
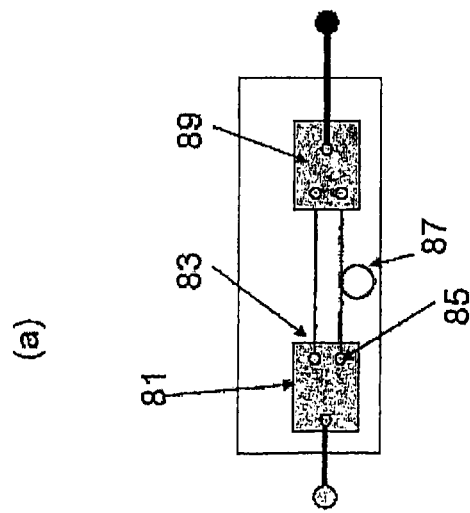

FIG. 5 shows a variation on the device described with reference to FIG. 4. The device of FIG. 5*a* takes the output from an APD and resistor (not shown) and provides it to hybrid junction 81. Hybrid junction 81 splits the output into a first part and a second part is described with reference to the power splitter 55 of FIG. 4a. However, hybrid junction 81 also introduces a 180° phase shift between the first part and the second part of the signal. The first part of the signal is output via output 83 and the second part is sent via output 85 into delay line 87.

The first part of the signal is shown in FIG. 5b and the second part of the signal which has passed through delay line 87 and is identical to FIG. 5b except being inverted and delayed by a clock period is shown as FIG. 5c.

The two signals shown in FIGS. 5b and 5c are then combined to produce the output signal of FIG. 5d. The signals are combined during power combiner 89 which does not need to allow a phase shift to one of the signals since this has been already performed by hybrid junction 81.

The systems of FIG. 4a and FIG. 5a have both used combinations of power splitters/combiners and hybrid junctions. However, the hybrid junction may be replaced by a combination of phase shifters and power combiners. For example, a power combiner and a 180° phase shifter, or two power combiner/splitters with a 90° phase shift etc.

In a further variation on the systems of FIG. 4a and FIG. 5a, a tuneable RF attenuator is provided which may be used in either of the inputs to hybrid junction 61 (FIG. 4a) or power combiner 89 (FIG. 5a) to ensure that the two signals reach the hybrid junction or power combiner with equal amplitudes.

Typically, all the hybrid junctions and power splitter/combiners have finite response frequency range. For example, hybrid junction, Mini-circuits ZFSCJ-2-4 has a frequency range of 50 MHz to 1 GHz. It may not work well when signal contains frequency components outside of the range, and the cancellation may not be perfect. To improve signal to noise ratio, further bandpass filters may be used to filter out those frequency components. In FIG. 4a, for example, a low bandpass filter may be placed after the hybrid junction output.

Figure 6:
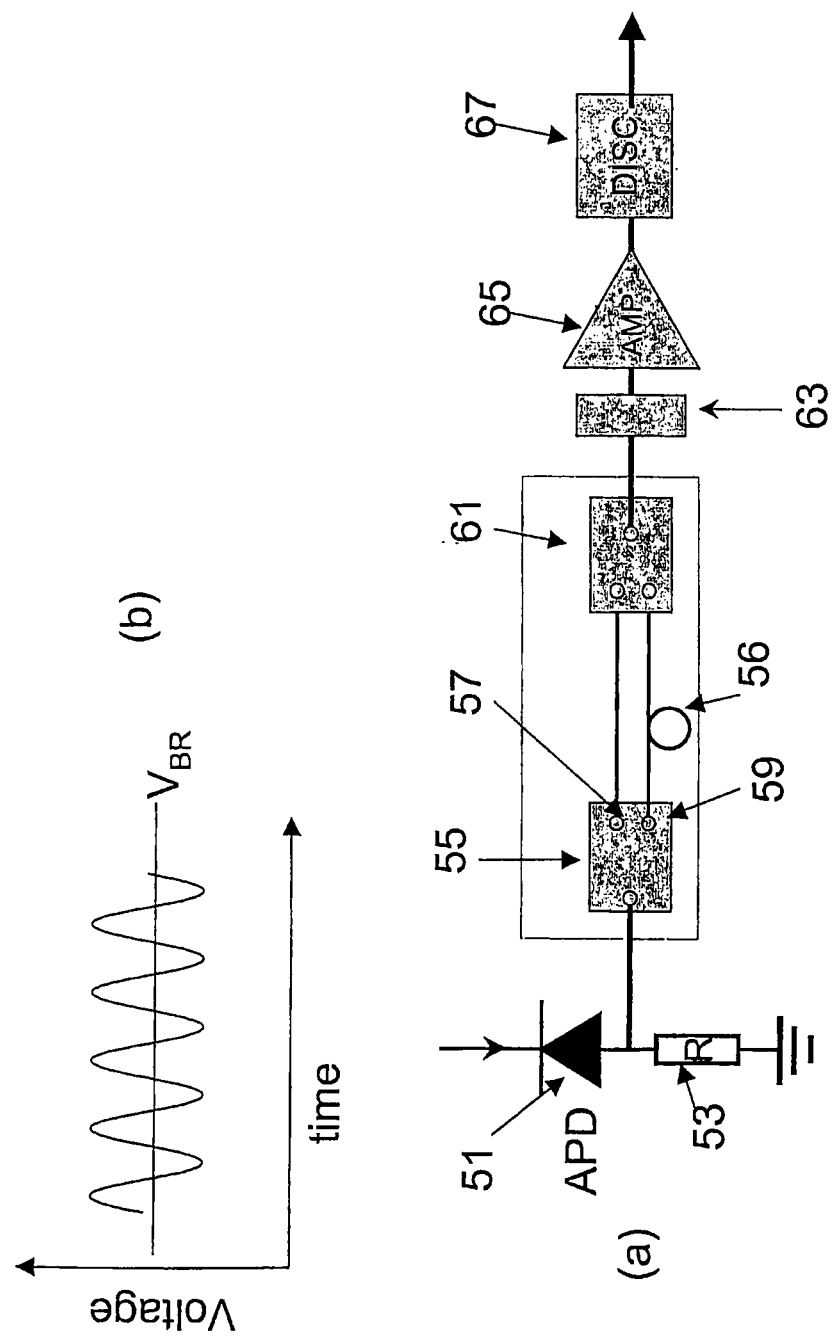

FIG. 6 shows a further variation on the system described with reference to FIGS. 4 and 5.

The system of FIG. 6a has an avalanche photodiode 51 and a resistor 53 as described with reference to FIG. 4a. Further, the voltage dropped across the resistor 53 is taken to power splitter 55 which splits the signal into a first part and a second part. The first part being outputted via output 57 and the second part via output 59 into delay line 56. The first part of the signal and the delayed second part are then fed into hybrid junction 61 which combines the two parts of the signal with 180° phase difference.

However, in the apparatus of FIG. 6a, the input voltage signal is a sinusoidal voltage signal as shown in FIG. 6b and not the periodic train of rectangular pulses as shown in FIG. 1b. It is possible to bias the detection system of FIG. 6A with a sinusoidal signal as long as the signal has sufficient voltage swing to bias the APD above and below the threshold for avalanche breakdown. In fact, the detector may be biased with any periodic voltage signal.

In response to the sinusoidal gating voltages, the APD output is also sinusoidal. Superimposed on the sinusoidal output are occasional avalanche spikes due to photon detection. The amplitude of avalanche spikes is typically much smaller than that of the sinusoidal output. However, as described previously with reference to FIG. 4a, by using a power splitter, delay line, and hybrid junction, the sinusoidal components can be largely cancelled and the avalanche spikes become clearly visible. Furthermore, any small remaining components of the sinusoidal signal may be removed from the output of the hybrid junction 61 by a band rejection filter 63 which is tuned to the frequency of the sinusoidal signal. The signal is passed to amplifier 65 and then discriminator 67 in order to determine the presence or absence of photon induced spikes in the outputted signal.

FIG. 7 shows a further variation in the system of FIG. 4, the configuration is the same as that described with reference to FIGS. 4a, 5a and 6a. The output signal is then fed into power splitter 101. Power splitter 101 divides the signal into a first part and a second part. The first part is output via output 103 and the second part via output 105 which is further fed into delay line 107. The two parts of the signal are then fed into differential amplifier 109. Due to the configuration of amplifier 109, only the difference of the two inputs is amplified. The output signal is not shown but will be similar to that shown in FIG. 4e.

FIG. 8 is a plot of the output of the detection system of FIG. 4a using an APD driven with a square wave operating at 625.1 MHz. The dark count probability per gate is plotted against photon detection efficiency. The APD is cooled at −40° C. To measure the detection efficiency, the APD was illuminated with laser pulses with a wavelength of 1550 nm, a duration of 100 ps, a repetition rate of 9.76 MHz, and an intensity of 0.1 photons per pulse on average.

In the measurement, the output of hybrid junction 61 (FIG. 4a) was fed into first a broadband amplifier, and then a discriminator which identifies each individual avalanche spike and converts the spike into a TTL pulse output. The TTL pulses are then counted by a pulse counter. The APD gating signal is square wave with 8-V amplitude, superimposed on a DC bias voltage typically 2 V below the avalanche breakdown voltage of the APD (which is 47 V). The points in FIG. 8 were recorded by varying the DC bias level. The higher the DC bias, the higher the detection efficiency. However, the detector dark count probability of the detector, defined as the output probability in the absence of any input light, also increases with the DC bias.

The results from FIG. 8 are surprisingly good since the APD is being driven with a frequency 625.1 MHz. This is considerably higher than the usual gating frequencies for APDs which are typically a few MHz. At the same time, little deterioration has been found in the efficiency of the same device and dark count probability as compared to low frequency operations. The ability to drive an APD at this frequency is possible due to self-differencing technique described in the present invention.

The high gating frequency allowed by the present invention means that the detection system can operate quasi-continuously. In quasi-continuous operation, there is no synchronization required between the source of photons and the detector. Quasi continuous operation is possible because for very high gating frequencies, the period at which the detector is incapable of detecting photons because its bias is below the breakdown voltage of the APD, is not prohibitive to the overall detection efficiency.

In order to avoid any unintentional synchronisation of the source and the detector it is desirable to vary the frequency of the signal used to gate the APD, for example the drive frequency may be varied randomly by applying some noise to the frequency.

In such a scheme, the delay line which introduces a time delay between the first part and the second part of the signal remains constant. However, the gating frequency may vary by a small amount, for example, 50 kHz, which essentially broadens the time window over which the detector is capable of detecting single photons.

FIG. 9 shows a plot of detector operated in quasi continuous mode using similar biasing condition described with reference to FIG. 8. The measured count rate i.e. the number of photons received per second is measured as a function of the photon flux. The photons were emitted by a cw laser diode operating at 1550 nm. The emission time of each photon is non-deterministic, and the APD is no longer able to synchronise with the incoming photons. The measurement result therefore indicates the performance of the detector used in continuous mode.

The actual measured count rate is shown with the black squares. The triangles show the net photon count rate which is the measured photon count rate minus the dark count rate. The dark count is determined by measuring the output of the detector in the absence of illumination.

It can be seen from the graph of FIG. 9 that high photon count rates are achieved close to 10 MHz, which is limited mainly by electronics deadtime. The detector shows a linear response over a 40 dB range, and a detection efficiency of 1.2%.

Figure 10:
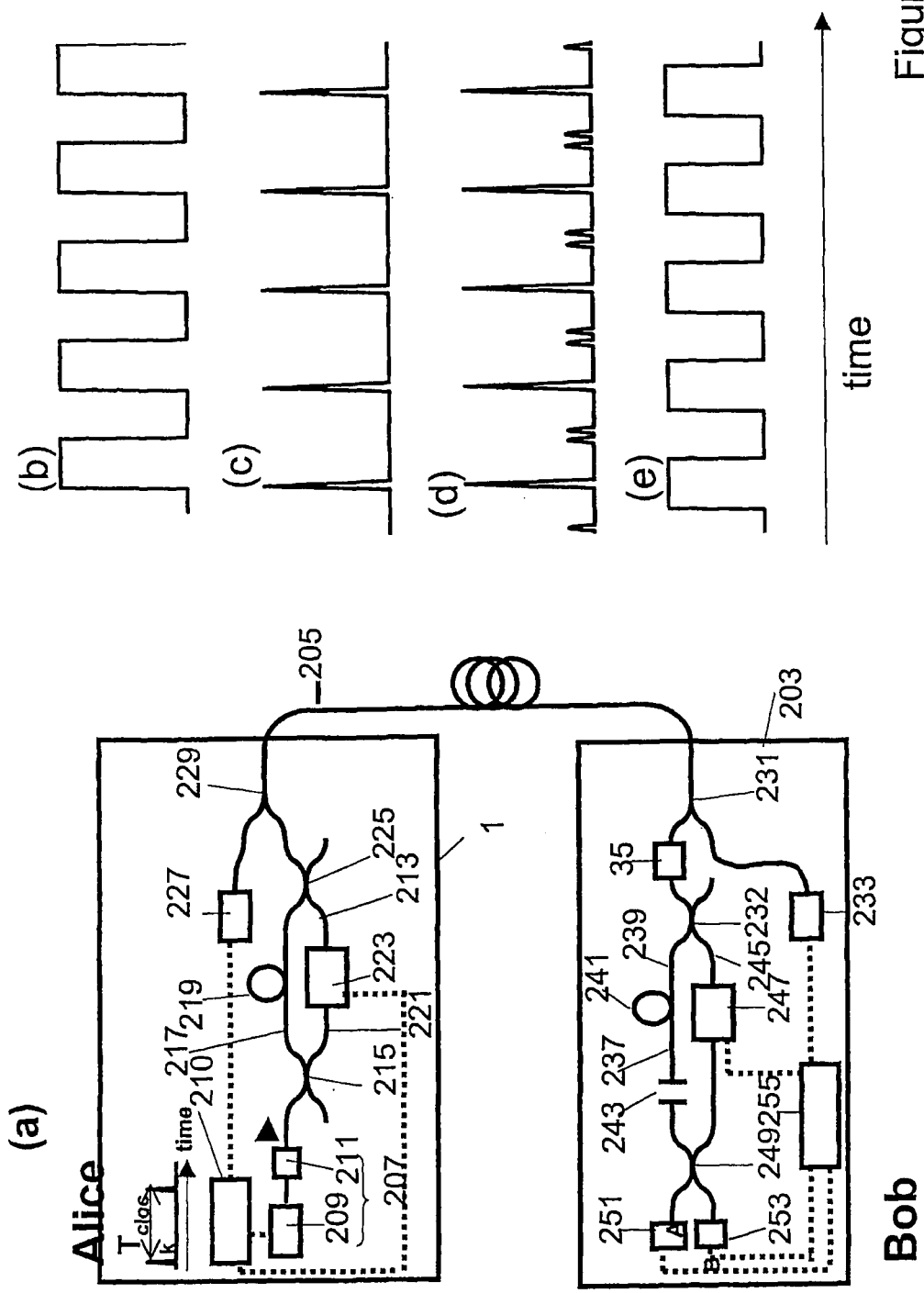

The detection system described in FIGS. 4 to 9 can be used in quantum cryptography systems, for example, the system of FIG. 10.

In FIG. 10A, a sender (Alice) 201 sends photons to a receiver (Bob) 203. The sender and receiver are linked by an optical fibre 205.

Alice generates single photons, which she encodes and sends to Bob, along with a bright laser pulse to act as a clock signal.

Alice's equipment comprises a single photon source 207. The single photon source is made from a pulsed laser diode 209 and an attenuator 211. The laser produces a single optical pulse for each clock signal with a repetition period of $T_{clock}$. Typically each laser pulse has a duration of $d_{laser}$=50 ps. The level of attenuation is set so that the average number of photons per pulse which are sent by Alice are much less than 1 (<<1), for example ]=0.1 is typical. Alternatively, the level of attenuation may be varied from pulse to pulse as described in GB2404103.

A clock signal is provided to the laser 209 by bias electronics 210. The bias electronics may comprise a timing unit, a driver for the signal laser 209, a driver for the clock laser 227 which will be described later and a driver for the phase modulator 223 which will be later described.

The photon pulses from the photon source 207 are then fed into an imbalanced Mach-Zender interferometer 213. The interferometer 213 consists of an entrance fibre coupler 215, a long Arm 217 with a delay loop of fibre 219 designed to cause an optical delay, a short arm 221 with a phase modulator 223, and an exit fibre coupler 225 which combines the fibres 217 and 221 from the long and short arms respectively. The length difference of long and short arms corresponds to an optical propagation delay of 0.5 ns. A photon travelling through the long arm will lag that travelling through the short arm 221 by a time of $t_{delay}$ at the exit of the interferometer 213.

The output of Alice's interferometer 213 is multiplexed with the output from a bright clock laser 227 at a WDM coupler 229. The clock laser 227 operates under the control of the biasing circuit 210. The clock laser 227 may emit at a different wavelength from that of the signal laser 209, so as to facilitate their easy separation at Bob's 203 end. For example the signal laser 209 may operate at 1.3 ]m and the clock laser 227 at 1.55 ]m or vice versa.

The multiplexed signal and clock pulses are transmitted to the recipient Bob 203 along optical fibre link 205.

Bob's equipment 203 is similar to Alice's equipment 201. Bob's equipment 203 comprises a WDM coupler 231 which is used to de-multiplex the signal received from Alice 201 into a signal from Alice's bright clock laser 227 and the pulses from Alice's signal laser 209.

The bright clock laser 227 signal is routed to an optical receiver 233 to recover the clock signal for Bob to synchronise with Alice. The optical receiver 233 transfers this signal to biasing circuit 255. Biasing circuit 255 synchronises various parts of Bob's equipment 203.

The signal pulses are fed into a polarisation controller 235 to restore their original polarisation.

The signal pulses then pass Bob's interferometer 237. Bob's interferometer 237 is similar to Alice's interferometer and has a long Arm 239 which comprises an optical fibre delay loop 241 and a variable fibre delay line 243. The short arm 45 of the interferometer 39 comprises a phase modulator 247. Phase modulator 247 is controlled by biasing circuit 255 in accordance with the signal received from clock laser 227.

The long arm 239 and the short arm 245 of the interferometer are connected to a 50/50 fibre coupler 249 with a single photon detector 251 and 253 attached to each output arm of the fibre coupler 249. The single photon detector 251 attached to one arm of the coupler 249 will be referred to as detector A and the single photon detector 253 attached to the other arm of the output coupler 249 will be referred to as detector B. Photon detectors 251 and 253 are controlled by biasing circuit 255 in accordance with the signal received from clock laser 227.

The variable delay line 243 at Bob's interferometer is adjusted to make the optical delay between its two arms 239 and 245 identical as that between the arms of Alice's interferometer 213, $t_{delay}$.

There are four possible paths for a signal pulse travelling from Alice's signal laser 209 to Bob's single photon detectors 251 and 253:

Alice's Long Arm 217—Bob's Long Arm 239 (Long-Long);

Alice's Short Arm 221—Bob's Long Arm 239 (Short-Long);

Alice's Long Arm 219—Bob's Short Arm 245 (Long-Short); and

Alice's Short Arm 221—Bob's short arm 245 (Short-Short).

Bob's interferometer 237 is balanced by adjusting the variable delay 243 so that photons taking paths (ii) and (iii) arrive at nearly the same time, at the exit coupler 249 of Bob's interferometer. Nearly the same time means within the signal laser coherence time which is typically a few picoseconds for a semiconductor distributed feed back (DFB) laser diode.

FIG. 10b is a trace of the clock which is output from laser 209 to the receiver 203. Typically the clock signal has a repetition of 1 GHz. FIG. 10c is a trace of the laser pulse which is used to generate the signal pulses.

FIG. 10d is a plot of the optical signal seen by the detectors 251 and 253 of receiver 203. Photons taking paths (ii) and (iii) corresponds to the large central peak in FIG. 10d. Photons taking path (i) have a positive delay $t_{delay}$ (later arrival time), and those taking path (iv) have a negative delay $t_{delay}$ (early arrival time) compared to paths (ii) and (iii). These form the smaller satellite peaks of FIG. 10d. Only photons arriving in the central peak shown in FIG. 10d undergo interference and are encoded by both Alice and Bob. Thus only these photons are of interest.

FIG. 10e is a plot of the gating bias which is in synchronization with the clock bias shown in FIG. 10b. Bob gates his detectors 251, 253 to record only photons in the central peak and not those in the earlier or later satellite peak.

By controlling the voltages applied to their phase modulators 223, 247, Alice and Bob determine in tandem whether paths (ii) and (iii) undergo constructive or destructive interference at detectors A and B, 251, 253.

The variable delay 243 can be set such that there is constructive interference at detector A 251 (and thus destructive interference at detector B 253) for zero phase difference between Alice and Bob's phase modulators. Thus for zero phase difference between Alice's and Bob's modulators and for a perfect interferometer with 100% visibility, there will be a negligible count rate at detector B 253 and a finite count rate at A 251.

If, on the other hand, the phase difference between Alice and Bob's modulators is 180°, there should be destructive interference at detector A 251 (and thus negligible count rate) and constructive at detector B 253. For any other phase difference between their two modulators, there will be a finite probability that a photon may output at detector A 251 or detector B.

In the four-state protocol, which is sometimes referred to as BB84, Alice sets the voltage on her phase modulator to one of four different values, corresponding to phase shifts of 0°, 90°, 180°, and 270°. Phase 0° and 180° are associated with bits 0 and 1 in a first encoding basis, while 90° and 270° are associated with 0 and 1 in a second encoding basis. The second encoding basis is chosen to be non-orthogonal to the first. The phase shift is chosen at random for each signal pulse and Alice records the phase shift applied for each clock cycle.

Meanwhile Bob randomly varies the voltage applied to his phase modulator between two values corresponding to 0° and 90°. This amounts to selecting between the first and second measurement bases, respectively. Bob records the phase shift applied and the measurement result (i.e. photon at detector A 251, photon at detector B 253, photon at detector A 251 and detector B 253, or no photon detected) for each clock cycle.

In the BB84 protocol, Alice and Bob can form a shared key by communicating on a classical channel after Bob's measurements have taken place. Bob tells Alice in which clock cycles he measured a photon and which measurement basis he used, but not the result of the measurement. Alice then tells Bob the clock cycles in which she used the same encoding basis and they agree to keep only those results, as in this case Bob will have made deterministic measurements upon the encoded photons. This is followed by error correction, to remove any errors in their shared key, and privacy amplification to exclude any information known to an eavesdropper.

Detectors 251 and 253 of receiver 203 in FIG. 10a may conveniently be provided by the detection systems discussed with reference to FIGS. 4 to 9.

FIG. 10a quantum communication system which may be used for the well-known BB84 protocol or B92 protocol. Recently, other quantum communication systems have been developed which use different protocols. The detector of the present invention with its higher frequency gated operation or quasi-continuous operation is particularly advantageous for these new types of quantum communication systems.

Figure 11:
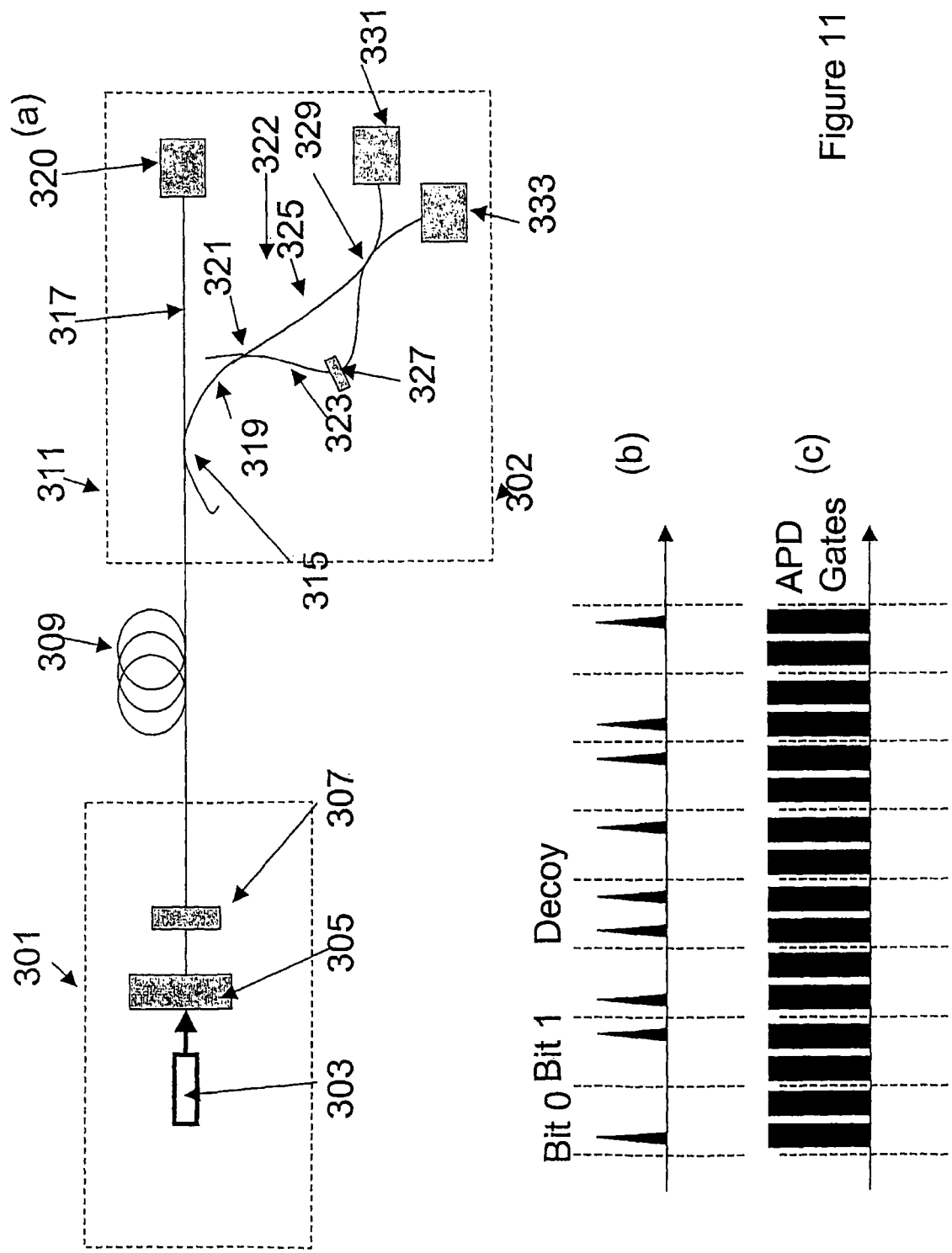

FIG. 11 shows quantum communication apparatus for another type of one-way quantum key distribution scheme. A sender's apparatus 301 comprises a coherent laser 303 which outputs a continuous pulsed beam into intensity modulator 305. Intensity modulator 305 either transmits the pulse or blocks it almost completely. The output from the intensity modulator 305 is then passed into attenuator 307 which attenuates the beam so that each pulse contains less than 1 photon on average. The output is then passed along fibre 309 to receiver 311.

At receiver 311, the beam first encounters beam splitter 315. Beam splitter 315 is configured to pass most of photons along path 317 and the remainder along path 319 into interferometer 320.

Path 317 extends to qubit detector 320 which is a detection system as described with reference to any of FIGS. 4 to 9. Path 319 directs photons to 50/50 beam splitter 321 which sends photons either along long arm 323 or short arm 325. Photons which pass along long arm 323 encounter phase shifter 327. The photons from path 323 and 325 are then combined by a beam splitter 329 which outputs photons either into detector 331 or into detector 333 dependent on the phase correlation between the photons.

FIG. 11b shows how bits may be encoded by the sender 301. Each bit consists of two "pulses". Bit 0 is encoded by a pulse sequence which comprises a first pulse which has intensity μ and a second pulse with intensity 0 and bit 1 is encoded with a first pulse which has intensity 0 and a second pulse which has intensity μ. In addition to sending bit 0 or bit 1, decoy states are sent which comprise two pulses with intensity μ.

Due to the coherence of the laser 303, there is a well defined phase relationship between any two neighbouring non-empty pulses. Therefore, within each decoy sequence, there is coherence. There is also coherence between some of the sequences, for example in the case where bit 0 is followed by bit 1. If an eavesdropper intercepts the pulses, the coherence of adjacent non-empty pulses will be affected. This loss of coherence can be determined by interferometer 320.

The interferometer is configured (by applying an appropriate phase shift and an appropriate difference between the length of the long 323 and short 325 arms) to ensure that photons exit into just one of the two detectors 331 and 333 when interference takes place. Thus by monitoring the count rate in the other detector it is possible to detect eavesdropping. Detectors 331 and 333 are described with reference to FIGS. 4 to 9.

Alice sends a stream of pulses as shown in FIG. 11b. The receiver 302 will then inform Alice 301 for which pulses the qubit detector 320 is fired. Alice will then advise 20, Bob which bits should be thrown away as they are due to decoy states. It should be noted that Bob only informs Alice in which sequence a count was received and does not inform Alice whether these bits were measured as bit 0 or bit 1.

The detectors 331 and 333 are used to monitor coherence. When two adjacent non-empty pulses pass through the interferometer 322, interference will take place between the early pulse passing thorough the long arm 323 and the late pulse passing through the short arm 325. Interference determines that there is a finite probability for detector 331 to fire, but negligible probability for detector 333 to fire, at this particular detection time bin. Violation of this means the loss of coherence. In the QKD, the receiver tells the transmitter when and which of the detectors 331 and 333 fires, and this allows the sender to establish whether or not coherence was broken.

The sender and receiver will then run error correction and privacy amplification on the results dependent on the loss of coherence which is well-known in the art to determine the secret key.

The detection systems described in FIGS. 4 to 9 can conveniently be used with the communication system of FIG. 11 since they provide higher speed operation and can also work in CW mode. FIG. 11c shows the gating voltage which is supplied to the APD's of the detection system. The gating pulse is synchronised with the expected arrival time of each incoming pulse. This gating system would be applied to the three detectors of the receiver 302 in FIG. 11a.

Figure 12:
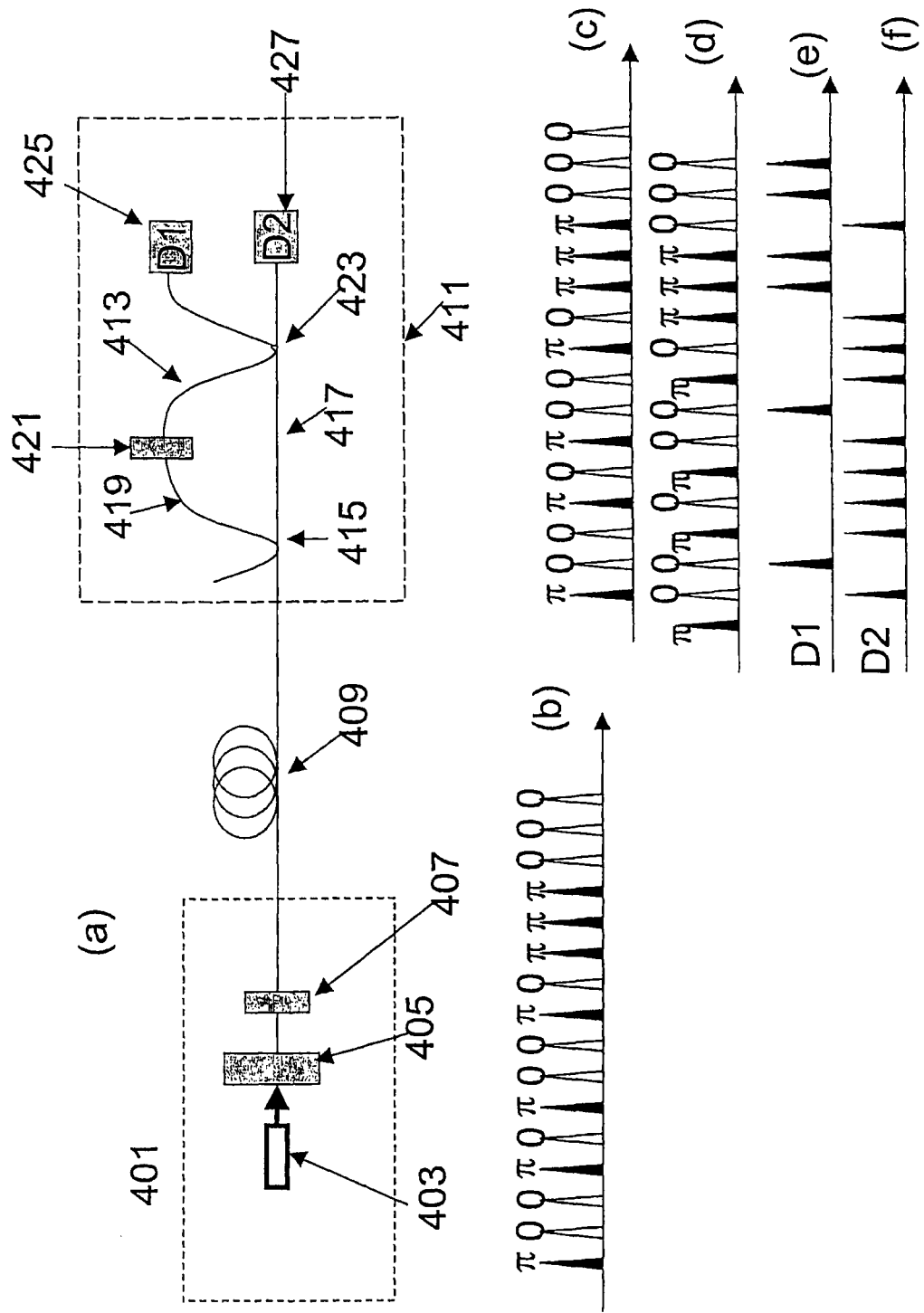

FIG. 12 shows a further quantum communication system. The communication system of FIG. 12a also uses coherence between adjacent pulses in order to communicate a key. The sender 401 comprises a pulsed coherent laser 403 which outputs to a phase modulator 405. The phase modulator is randomly varied to apply a phase modulation of either 0 or 180 degrees. It is possible to apply some other phase shifts providing that the difference between the two phase shifts is 180. The signal is then attenuated by attenuator 407 which ensures that there is less than one photon per pulse. This is then transmitted down fibre 409 to receiver 411. Receiver 411 comprises an interferometer 413. Interferometer 413 comprises a first beam splitter 415 which directs photons either down short arm 417 or long arm 419. Long arm 419 comprises a phase shifter 421. The long arm 419 and the short arm 417 are recombined at second beam splitter 423 which then outputs to a first detector 425 and a second detector 427.

The sender 401 sends a pulse train where each pulse is modulated by either a 0° phase shift or a phase shift of 180 degrees. This is shown in FIG. 12b. At the receiver's side, the received pulse train is split into two paths: the short arm 417 and the long arm 419. FIG. 12c shows the pulse train at the short arm 417, and FIG. 12d shows the pulse train at the long arm 419. Notice that the pulse train in long arm is delayed by exactly a clock period. The interferometer 413 is configured by varying the phase shift or the relative length or arms 417 and 419 to essentially introduce a 1 bit delay. Therefore, the interferometer 413 can be thought of as interfering the pulse train shown in FIG. 12c with the pulse train shown in FIG. 12d. The pulse train in FIG. 12d is the same as that of FIG. 12c but has a 1 bit delay. This results in the detection of pulses shown in FIG. 12e at detector 425 and the detection of pulses shown in FIG. 12f at detector 427.

The security relies upon the uncertainty in the detection time of a photon. Due to coherence, the photon's wavefunction is spread over a number of adjacent time bins. An eavesdropper eve's detection of a photon causes its wavefunction to collapse into a single time bin, and she is only able to know the phase difference between two particular time bins. Therefore she is not able to re-produce the original state which is coherent over a number of time bins. This prevents intercept-and-resend attack. It is also inherently secure against photon number splitting attack. Eve may split a photon from the pulse train, however, it will not necessarily collapse into the same time bin as that detected by Bob.

Previously, the differential phase shift QKD is implemented using a CW detector, and discrimination between neighbouring time bins is done in the post processing with a time-resolution of 10-ps. Such a post-processing requires either sophisticated hardware or software data processing. With detectors running in gated mode, time discrimination is automatic requiring no post processing.

The invention claimed is:

1. A photon detection system comprising:
a photon detector configured to generate an output signal, the output signal comprising voltage spikes generated in response to single photons, the photon detector being gated by an input gating signal such that the output signal further comprises a periodic component generated in response to the gating signal, the voltage spikes generated in response to single photons being superimposed on the periodic component, the gating signal having a frequency of at least 50 MHz,
the system further configured to vary a frequency of the gating signal to input to the photon detector by randomly applying noise to the frequency of the gating signal,
the system further comprising a combiner for combining the output signal from one period with output signals from other periods such that the periodic component of the output signal is suppressed.

2. A system according to claim 1, wherein the photon detector is an avalanche photodiode.

3. A system according to claim 1, further comprising a voltage source configured to apply a periodic gating signal to said detector.

4. A system according to claim 3, wherein the gating signal is a square wave signal.

5. A system comprising a source and a detection system according to claim 1, wherein there is no synchronisation between the source of the photons and the gating of the detector.

6. A system according to claim 5, wherein the source is a CW source.

7. A quantum communication system comprising a sender and a receiver, said sender comprising a source of pulsed radiation and an encoder for encoding information on said radiation pulses, said receiver comprising a detection system according to claim 1.

8. A quantum communication system according to claim 7, wherein there is no synchronisation between the source of photons and the gating of the detector.

9. A quantum communication system according to claim 7, wherein said encoder encodes pulses using an encoding base randomly selected from two or more non-orthogonal basis.

10. A quantum communication system according to claim 7, wherein said sender comprises a coherent source and said encoder encodes information by selectively transmitting pulses having an average intensity of less than one photon and empty pulses have no photons.

11. A quantum communication system according to claim 7, wherein said sender comprises a coherent source and said encoder is configured to encode photons with a first phase or a second phase and the difference between the first phase and the second phase is 180° and wherein the receiver is configured to interfere photons from one pulse with those of the following pulse.

12. A photon detection system comprising:
a photon detector configured to generate an output signal, the output signal comprising voltage spikes generated in response to single photons, the photon detector being gated by an input gating signal such that the output signal further comprises a periodic component generated in response to the gating signal, the voltage spikes generated in response to single photons being superimposed on the periodic component, the gating signal having a frequency of at least 50 MHz,
the system further configured to vary a frequency of the gating signal to input to the photon detector by an amount of less than 50 kHz during detection by the photon detector,
the system further comprising a combiner for combining the output signal from one period with output signals from other periods such that the periodic component of the output signal is suppressed.

13. A system according to claim 12, wherein the photon detector is an avalanche photodiode.

14. A system according to claim 12, further comprising a voltage source configured to apply a periodic gating signal to said detector.

15. A system according to claim 14, wherein the gating signal is a square wave signal.

16. A system comprising a source and a detection system according to claim 12, wherein there is no synchronisation between the source of the photons and the gating of the detector.

17. A system according to claim 16, wherein the source is a CW source.

18. A quantum communication system comprising a sender and a receiver, said sender comprising a source of pulsed radiation and an encoder for encoding information on said radiation pulses, said receiver comprising a detection system according to claim 12.

19. A quantum communication system according to claim 18, wherein there is no synchronisation between the source of photons and the gating of the detector.

20. A quantum communication system according to claim 18, wherein said encoder encodes pulses using an encoding base randomly selected from two or more non-orthogonal basis.

21. A quantum communication system according to claim 18, wherein said sender comprises a coherent source and said encoder encodes information by selectively transmitting pulses having an average intensity of less than one photon and empty pulses have no photons.

22. A quantum communication system according to claim 18, wherein said sender comprises a coherent source and said encoder is configured to encode photons with a first phase or a second phase and the difference between the first phase and the second phase is 180° and wherein the receiver is configured to interfere photons from one pulse with those of the following pulse.

* * * * *